Aug. 30, 1960  W. A. BEDFORD, JR  2,950,937
FASTENING DEVICE
Filed Nov. 7, 1957

INVENTOR:
WILLIAM A. BEDFORD Jr.
By Walter P. Jones
ATTORNEY.

United States Patent Office 2,950,937
Patented Aug. 30, 1960

2,950,937
FASTENING DEVICE

William A. Bedford, Jr., North Scituate, Mass., assignor to United-Carr Fastener Corporation, Cambridge, Mass., a corporation of Delaware Filed Nov. 7, 1957, Ser. No. 694,937

1 Claim. (Cl. 287—126)

This invention relates generally to fastening devices and has particular reference to a fastener for use in inseparably retaining two objects together.

The object of the invention is to provide a fastener for assembly into a recess in a support and to receive another member of any suitable construction inserted therein to lock the parts solidly in assembly, particularly against axial pull.

A further object of the invention is to provide a fastener having a tubular body member with two or more series of tongues integral with said body and one series of which is disposed about the said body and another series is adapted to receive a stud like member inserted therein for engagement therewith.

Other objects of the invention will, in part, be obvious, and will, in part, appear hereinafter.

Figure 1:
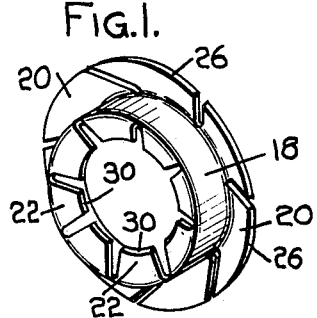
Fig. 1 is a perspective view of a fastener embodying the features of the invention.
Figure 2:
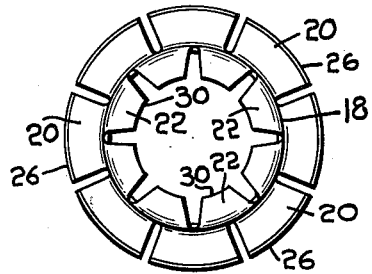
Fig. 2 is a top plan view of the fastener shown in Fig. 1.

Referring to the drawing, there is illustrated a fastener which is adapted for assembly into the socket 10 of a support 12 for receipt of a stud member 14 of another support 16.

In the preferred embodiment, the fastener comprises a tubular body portion 18, a series of outwardly extending spring tongues 20 integral with the body 18 at one end and a second series of inwardly extending spring tongues 22 integral with the body 18 at the opposite end.

Figure 3:
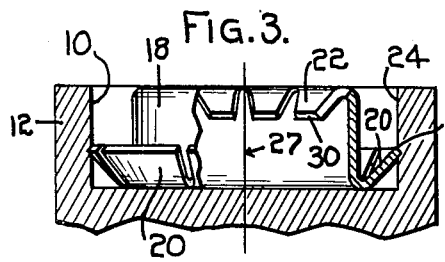
Fig. 3 is a view partly in section, and partly in elevation, illustrating the fastening device, as shown in Fig. 1, assembled into the socket of a supporting member.

To use the fastener, the fastener is inserted into the socket 10 in the support 12 so that the outwardly extending spring tongues 20 engage the wall 24 of the socket 10, at their outer edges 26. In the preferred embodiment, the edges 26 of the spring tongues 20 lie on the circumference of a circle whose radius taken from the axis 27 of the tubular body 18 will be a predetermined length, greater than the radius of the socket 10 so that the spring tongues 20 will be compressed inwardly toward the inside of the socket 10, thereby creating a state of tension with the wall 24 and causing the tongues 20 to exert engaging pressure against the wall 24. The stud member 14 of the support 16 is then inserted into the tubular body 18 against the inwardly extending spring tongues 22, whose edges 30 lie on the circumference of a circle whose radius taken from the axis 27 (shown in Fig. 3) of the tubular body 18 will be a predetermined length less than the radius of the stud member 14, compressing them inwardly toward the wall 24 of the socket 10, creating a state of tension between the spring tongues 22 and the stud wall 32 causing the tongues to exert engaging pressure against the stud wall 32.

My preferred fastener may be formed from any suitable material that will produce the desired construction. I have found that an inexpensive, simple fastener may be made from steel, heat treated after forming.

Figure 4:
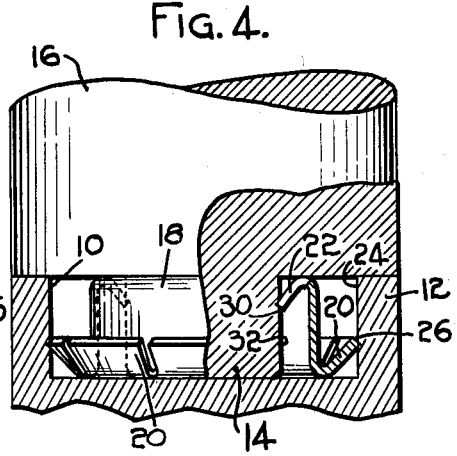
Fig. 4 is a partially complete assembly of my improved fastener, partly in elevation and partly in section and parts held thereby.

My improved fastener may be used for many applications, such as, assembling the supports 12 and 16 end to end as shown in Fig. 4. It may also be used in holding a cap on a screw or bolt head, furniture legs to other parts of the furniture and other constructions of joints that will be obvious to anyone skilled in the art.

Since certain other obvious modifications may be made in this device without departing from the scope of the invention, it is intended that all matters contained herein be interpreted in an illustrative and not in a limiting sense.

I claim:

A one-piece fastening device for assembly into an opening in a supporting member to receive and engage a stud member inserted into the opening, comprising a hollow, cylindrical body having a circumferential, relatively rigid wall; an outwardly-extending support member-engaging first series of spring tongues integral with and extending outwardly and angularly from one end of said body in the direction of the other end of said body, said series of spring tongues disposed outside said wall circumferentially to form a segmented substantially truncated cone, and a second series of inwardly-extending, stud member-engaging spring tongues integral with and extending inwardly and angularly from the other end of said body in a direction opposite to that of said first series of spring tongues, said second series of inwardly extending series of tongues being circumferentially spaced therearound inside the wall of said body to form a segmented substantially truncated cone, the surfaces of said support-engaging series of spring tongues and the surfaces of said stud-engaging series of spring tongues lying in planes spaced from but parallel to one another.

References Cited in the file of this patent

UNITED STATES PATENTS

| | | |
|---|---|---|
| 2,529,219 | Kost | Nov. 7, 1950 |
| 2,670,226 | Becker | Feb. 23, 1954 |